Nov. 19, 1968   N. H. MOORE ET AL   3,411,663

BASKET STYLE CARRIER AND METHOD FOR FORMING SAME

Filed May 19, 1966   7 Sheets-Sheet 1

FIG_1

FIG_2

FIG_3

FIG_9

INVENTORS
NORMAN H. MOORE
ERNEST C. PELLATON
BY THOMAS W. FOSTER

ATTORNEYS

Nov. 19, 1968   N. H. MOORE ET AL   3,411,663
BASKET STYLE CARRIER AND METHOD FOR FORMING SAME
Filed May 19, 1966   7 Sheets-Sheet 6

FIG_21

FIG_22

FIG_23

FIG_29

INVENTORS
NORMAN H. MOORE
ERNEST C. PELLATON
THOMAS W. FOSTER
ATTORNEYS

United States Patent Office 3,411,663
Patented Nov. 19, 1968

3,411,663
BASKET STYLE CARRIER AND METHOD FOR FORMING SAME
Norman H. Moore, Palo Alto, Ernest C. Pellaton, Larkspur, and Thomas W. Foster, Palo Alto, Calif., assignors to Fibreboard Paper Products Corporation, San Francisco, Calif., a corporation of Delaware
Filed May 19, 1966, Ser. No. 551,263
36 Claims. (Cl. 220—115)

ABSTRACT OF THE DISCLOSURE

A one piece blank is formed into a basket style carrier by having the integrally connected major panels thereof folded at least three times along a common line and secured together. The completed carrier comprises vertically disposed and parallel side panels connected together by end panels and a centrally disposed partition having a handle portion formed thereon. Dividers for the retained articles may be formed integrally with the carrier or may comprise a separate member.

---

This invention relates to basket style carriers and more particularly relates to a carrier blank, a method for folding and gluing the blank to form a carrier and an erected basket style carrier adapted to retain a plurality of bottles or the like therein.

The popularity of paperboard bottle carriers dictates the need for an economical carrier which may be expeditiously formed and yet constructed and arranged to exhibit a degree of structural integrity. The erected carrier must be constructed so that the retained bottles will not become dislodged when transported nor break due to contact therebetween.

A number of prior art bottle carriers require complicated apparatus and methods for forming its blank into erected form. In addition, such methods oftentimes inherently waste a considerable amount of paperboard due to the fact that the individual carrier blanks cannot be suitably aligned and cut out of a paperboard stock to prevent such waste. Also, the resulting carrier does not always afford the desired strength to efficiently retain bottles therein nor provide adequate bottle separation to prevent breakage.

This invention overcomes a number of the above, briefly mentioned prior art difficulties by providing a one-piece carrier blank arranged to have the major integrally connected panels and flaps thereof aligned in a single row. The blank is preferably folded and glued by a method whereby such folding all occurs along a common line arranged perpendicularly with respect to the fold or score lines. The individual carrier blanks are further constructed and arranged so that they may be nested or interlocked with each other when cut by a suitable die to limit the amount of wasted blank material. The formed basket style carrier comprises a tubular body portion, a horizontally disposed bottom portion and a vertically disposed partition and handle portion, all totally integrated to efficiently retain and separate bottles therein. Divider panels are preferably arranged between the partition and body portions of the carrier to form compartments therein for bottle retention purposes.

An object of this invention is to provide an economical, multipaneled and one-piece carrier blank adapted to be expeditiously erected into a basket style carrier.

Another object of this invention is to provide a strong basket style carrier comprising integrated body, bottom and partition portions constructed and arranged to efficiently retain bottles therein.

Another object of this invention is to provide a basket style carrier comprising an integrated multi-ply handle and partition panel arranged to stabilize and strengthen the carrier.

Another object of this invention is to provide a basket style carrier comprising panels arranged to form compartments for separating bottles retained in the carrier and further arranged to stabilize and strengthen the carrier.

Another object of this invention is to provide a multi-paneled blank comprising a handle re-enforcing panel detachably connected to one of the blank's panels.

Another object of this invention is to provide a method for expeditiously and economically forming a blank into a basket style carrier by folding all of the blank's panels along a common line.

Further and more specific objects of this invention will become apparent from the following description and drawings wherein:

FIGS. 1–9 CARRIER

Figure 1:
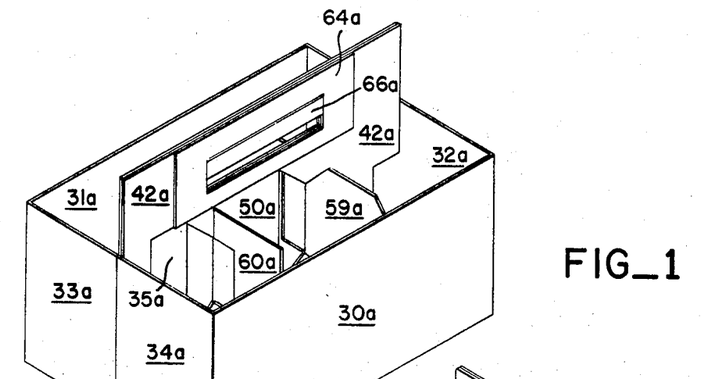
FIG. 1 is an isometric view illustrating a first basket style carrier embodiment of this invention.
Figures 2, 3:
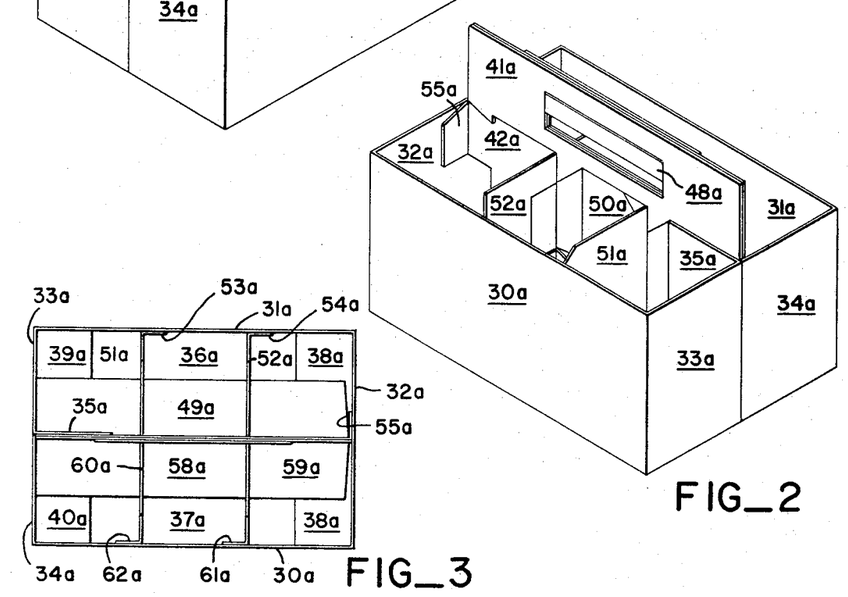
FIG. 2 is an isometric view disclosing the opposite side of the carrier illustrated in FIG. 1.
FIG. 3 is a top plan view of the carrier disclosed in FIGS. 1 and 2.
Figure 4:
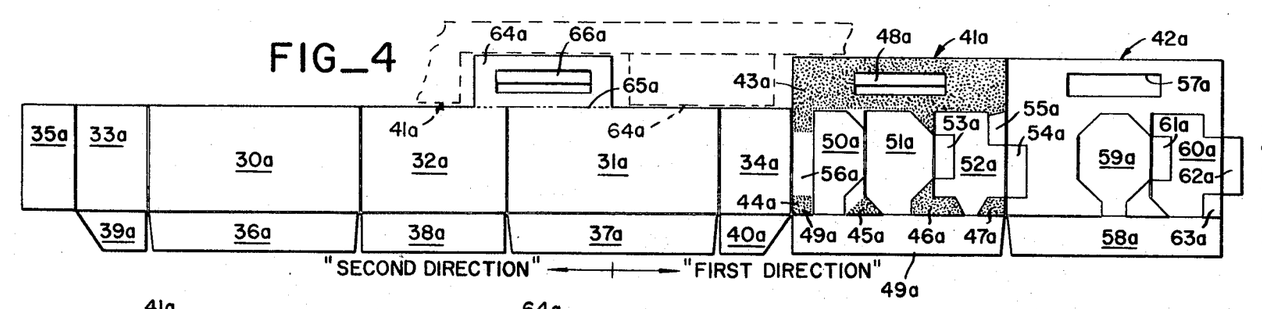
FIG. 4 is a top plan view of the blank utilized to form the carrier disclosed in FIGS. 1–3.

The carrier disclosed in FIGS. 1–3 initially comprises the one-piece blank illustrated in FIG. 4. The blank is suitably cut and scored to be folded at common score lines throughout and glued to assume the flattened condition illustrated in FIG. 9 for shipping purposes. suitable apparatus may be employed at a bottling or like plant to open the flattened carrier and form it for retention and separation of a plurality of bottles therein. Although this carrier, as well as the other carriers hereinafter described, is preferably constructed and arranged to retain six bottles in two rows. The term "integrally connected" as herein employed may be followed to form a carrier arranged to retain any desired number of bottles in a predetermined number of rows. The term "integrally connected" as herein employed means that particular panels or flaps or other portions of the carrier are connected together at common score lines, i.e., they do not constitute separate pieces which are glued or otherwise secured together.

Figure 9:
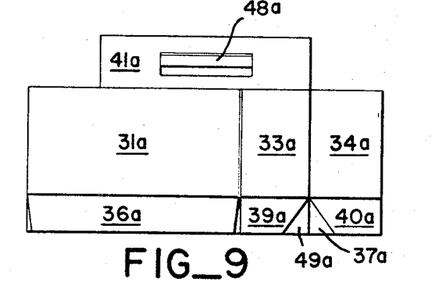

The blank illustrated in FIG. 4 comprises a plurality of panels and flaps connected in series by suitable common score or fold lines whereby they may be folded and secured together to form the flattened carrier illustrated in FIG. 9 and thence the erected carrier (FIGS. 1–3). The blank is arranged to "nest" with another like blank prior to cutting to limit the amount of wasted paperboard. It can be seen that a second blank would nest with the blank of FIG. 4 and be co-extensive therewith by having its handle re-enforcing panel positioned between panels 41a and 64a. The carrier comprises vertically disposed and parallel first and second side panels 30a and 31a connected together by vertically disposed and parallel first end panel 32a and first and second end panel portions 33a and 34a which form the second end panel. These panels will be hereinafter termed the "body portion" of the carrier. An end or manufacurer's glue flap 35a is arranged, as more clearly disclosed in FIG. 3, to aid in securing the above panels together. Bottom flaps 36a–40a are attached to panels 30a–34a, respectively, by suitably arranged score or fold lines to aid in forming a "bottom portion" of the carrier in a manner hereinafter explained.

Superimposed partition panels 41a and 42a comprise a vertically disposed "partition portion" or "partition and handle portion" of the carrier, arranged in parallel relationship to side panels 30a and 31a. Glue patterns 43a–47a (FIG. 4) are suitably applied to panel 41a during the forming operation to secure the partition panels together. A flap 48a is hingedly connected by a suitable score line, within an aperture formed at an upper portion of panel 41a, to aid in forming the handle portion of the carrier (FIG. 2). A flap 49a is connected to the bottom portion of panel 41a for purposes hereinafter explained.

Referring more particularly to FIGS. 2 and 3, first, second and third divider panels 50a–52a are suitably cut and scored within panel 41a and formed integral therewith to aid in forming compartments in the carrier to separate and confine bottles retained therein. Divider panels 50a and 51a are integrally connected to each other at a common score line (FIG. 4) with divider panel 50a arranged to be folded out of and back into the plane of partition panel 41a (through 180°) and within an opening formed by removal of divider panel 51a. Tabs 53a and 54a are connected to divider panels 51a and 52a, respectively, by suitably arranged score lines to connect these panels to side panel 31a. A tab 55a is suitably connected to panel 42a by a score line to secure panel 42a to end panel 32a. A vertically disposed portion 56a of panel 41a is arranged to aid in securing the "partition and handle portion" of the carrier to end panel portions 33a and 34a via flap 35a.

An aperture 57a is formed in the upper portion of panel 42a to cooperate with the aperture formed in panel 41a to provide means for manually grasping the carrier. A flap 58a is connected to a bottom portion of panel 42a by a suitably arranged score line to aid in forming the bottom portion of the carrier along with flaps 36a–40a and 49a. As more clearly disclosed in FIG. 3, these flaps may be integrated in the manner illustrated to form a strong carrier "bottom portion." Divider panels 59a and 60a have tabs 61a and 62a, respectively, connected thereto for attaching these panels to side wall 30a to form compartments similar to the compartments formed by divider panels 50a–52a.

A tab 63a is suitably connected by a score line to flap 58a and arranged to be secured to glue spot 44a of panel 41a in the erected carrier. A handle re-enforcing panel 64a is detachably secured to panels 31a and 32a by a cut line 65a to permit this panel to be detached therefrom and secured to the handle portions of panels 41a and 42a (FIG. 1). A flap 66a is connected within an aperture formed in this panel to cooperate with underlying flap 48a and aperture 57a to form means for manually grasping the carrier.

The following method is preferably followed to form the blank illustrated in FIG. 4 into the carrier illustrated in FIGS. 1–3.

The blank is preferably arranged in a suitable apparatus or so-called "straight line gluer" (not shown) so that the blank may be moved upwardly in FIG. 4 by means of a conventional conveyor (not shown) along a line of flight therethrough. However, it should be understood that such apparatus could be arranged to move the blank in any desired direction for carrier forming purposes. A novel aspect of this method constitutes the manner in which all of the blank's panels and flaps are folded along a common line arranged transversely to such line of flight, i.e., about the various fold or score lines which are arranged perpendicularly relative to such common line. The term "first direction" will hereinafter mean movement or folding of a panel, flap or tab rightwardly in FIG. 4 (and corresponding figures for the forming of other carrier embodiments). The term "second direction" will mean that a particular panel, flap or tab is folded in a direction opposite to the "first direction," i.e., leftwardly in FIG. 4.

Figures 5, 6:
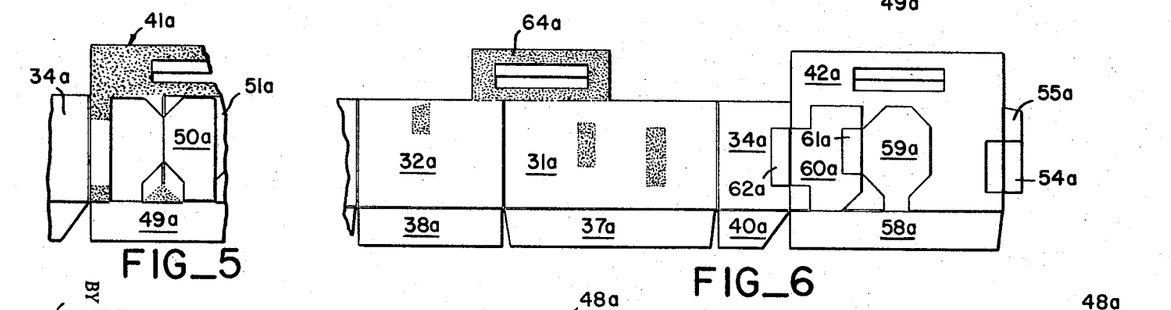
FIGS. 5–9 are top plan views illustrating steps occurring during the preferred method for forming the carrier disclosed in FIGS. 1–3.

Glue patterns are initially formed on panel 41a in the manner illustrated in FIG. 4 and divider panel 50a is folded in the "first direction" to superimpose it upon panel 51a (FIG. 5). Panel 42a is then folded in the "second direction" to superimpose it upon panel 41a (FIG. 6). The glue patterns illustrated in FIG. 4 will function to secure overlying portions of panels 41a and 42a together when subjected to conventional compression rolls (not shown). It should be noted that tab 54a, attached to divider panel 52a, is not folded during this folding step whereas tab 55a is reverse folded (through 180°) since it is arranged to remain co-planar with respect to the plane of panel 42a. Glue patterns are suitably applied to panels 31a, 32a, and 64a (FIG. 6).

Figure 7:
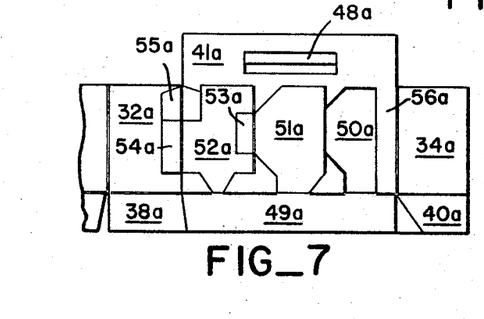
Figure 8:
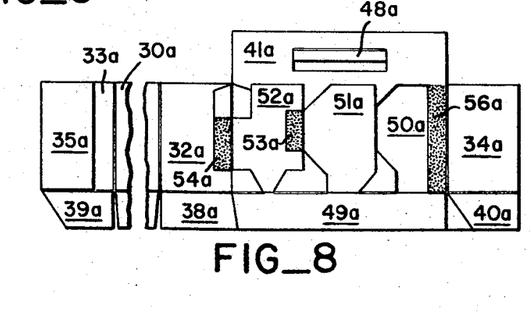

Panel 34a and superimposed panels 41a and 42a are folded in the "second direction" to superimpose them upon panels 31a and 32a, as illustrated in FIG. 7. Conventional compression rolls (not shown) may be utilized to secure divider panels 59a and 60a to side panel 31a and tab 55a to end panel 32. End panel portion 35a is folded in the "first direction" to superimpose it upon end panel 33a. Suitable glue patterns are applied to tabs 53a and 54a and panel portion 56a. Panels 30a, 33a, and 35a are then folded in the "first direction" to superimpose them upon the remaining panels (FIG. 9). Suitable compression rolls (not shown) may be arranged to secure tabs 53a and 54a to side panel 30a and flap 35a to portion 56a of panel 41a.

Thus, flattened carriers which have been expeditiously and economically formed in the manner aforedescribed may be shipped to a bottling or like plant and thereafter formed into the basket style carrier illustrated in FIGS. 1–3. The bottom portion of the carrier may be formed by first opening the flattened carrier and then folding flaps 49a and 58a to a substantially horizontally disposed position (FIG. 3). Flaps 38a, 39a and 40a are then folded onto flaps 49a and 58a. Thereafter, a suitable adhesive is applied in a straight line to flaps 36a and 37a and the flaps are folded and secured to the other flaps to form a strong, integrated bottom portion of the carrier. When the flattened carrier is opened initially, handle re-enforcing panel 64a detaches from panels 31a and 32a to assume the position illustrated in FIG. 1.

It should be noted that the formed center partition and handle portion of the carrier comprises a multi-ply handle arranged to extend the length of the carrier. Such an arrangement affords a high degree of end-to-end compression strength and stability thereto as well as a strong and integrated handle for carrying purposes. Divider panels 50a, 51a, 52a, 59a and 60a are arranged in the carrier to be substantially co-extensive vertically with respect to the body portion thereof. Such an arrangement affords a full shoulder to heel separation of the bottles retained in the carrier to prevent breakage and also functions to retain the bottles efficiently. In addition, the divider panels are integrated into the carrier to afford further stability and side-to-side compression strength thereto.

The above-described bottom flaps, forming the bottom portion of the carrier, are integrated with the other portions of the carrier to further strengthen and stabilize it. It should be further noted that only a single manufacturer's glue joint, arranged between end panel portions 33a and 34a, is formed on the perimeter of the body portion of the carrier to enhance the appearance thereof and minimize printing problems and the like.

Figures 10, 11, 12:
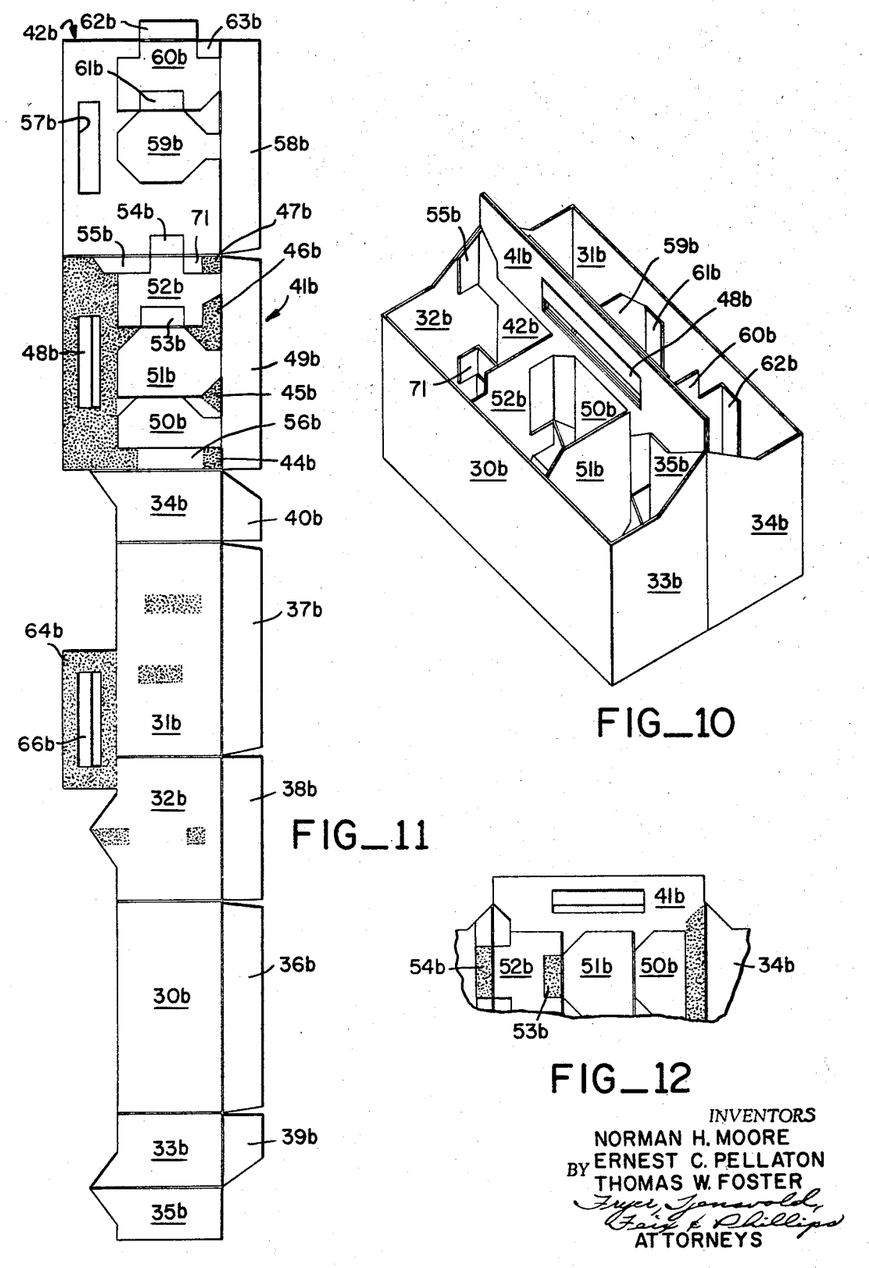
FIG. 10 is an isometric view illustrating a second basket style carrier embodiment of this invention.
FIG. 11 is a top plan view of the blank utilized to form the carrier disclosed in FIG. 10.
FIG. 12 is a top plan view illustrating a folding step occurring during the preferred method for forming the carrier disclosed in FIG. 10.

FIGS. 10-12 CARRIER

The second carrier embodiment is illustrated in FIGS. 10-12 and is substantially identical to the above-described first carrier embodiment. The numerals disclosed in these figures (accompanied by letter b) depict corresponding, like-numbered (but accompanied by letter a) elements incorporated into the first carrier embodiment. The second carrier embodiment differs from the first one in that a tab 71 may be cut out of partition panel 41b and secured to first end panel 32b (FIG. 10) in the erected carrier to further stabilize the centrally disposed partition and handle portion thereof. Also, V-shaped extension portions may be formed on first end panel 32b, end panel portions 33b and 34b forming the second end panel, flap 35b and tab 55b to further strengthen the integrated carrier.

The method preferably employed to form the second blank embodiment, illustrated in FIG. 11, into the carrier illustrated in FIG. 10 is substantially identical to the first explained method. The glue patterns utilized during carrier formation are also substantially identical, as can be seen when FIGS. 11 and 12 are compared with the corresponding glue patterns illustrated in FIGS. 4 and 8, respectively.

FIGS. 13-20 CARRIER

Figure 15:
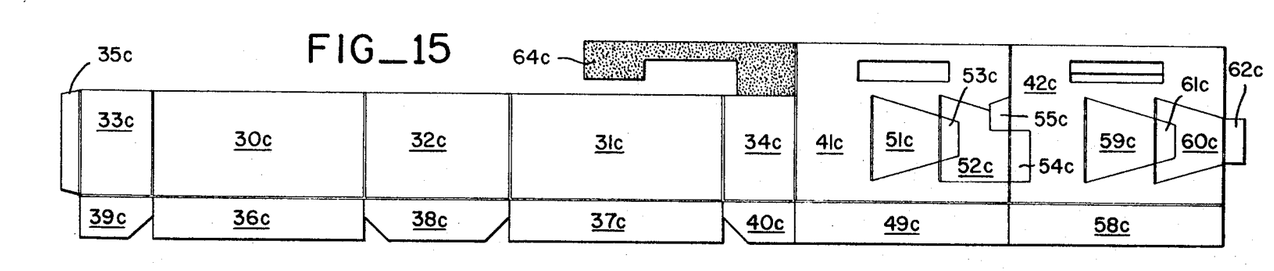
FIG. 15 is a top plan view of the blank utilized to form the carrier disclosed in FIGS. 13 and 14.

A third carrier embodiment is illustrated in FIGS. 13-20. The letter c accompanies numerals which depict elements corresponding to like-numbered elements disclosed in the first carrier embodiment. One difference therebetween is the construction and arrangement of handle reenforcing panel 64c, hingedly connected ot partition panel 41c, as illustrated in FIG. 15. This panel is folded and secured between panels 41c and 42c in the erected carrier and is not detachably secured to the blank as was true with corresponding panels 64a and 64b of the first two carrier embodiments. In addition, a divider panel, corresponding to panels 50a and 50b of the first two embodiments, is not employed to separate the two bottles retained in the middle of the carrier. Additional differences will be made apparent from the following description, drawn to the preferred method for forming the blank of FIG. 15 into the carrier illustrated in FIGS. 13 and 14.

Figures 16, 17:
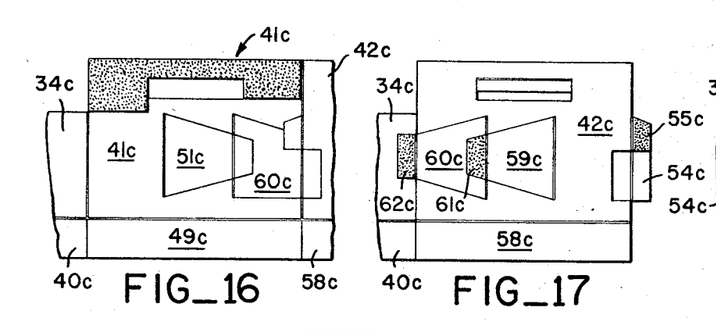
FIGS. 16–20 are top plan views illustrating steps occurring during the preferred method for forming the carrier disclosed in FIGS. 13 and 14.

The blank is preferably arranged to be moved upwardly in FIG. 15 in its line of flight through a suitable carrier forming apparatus. Handle re-enforcing panel 64c is coated with a suitable adhesive and folded in the above-defined "first direction" and secured to the upper handle portion of the panel 41c, as illustrated in FIG. 16. Adhesive is then applied to the opposite surface of panel 64c. Panel 42c is folded in the "second direction" to superimpose it upon panel 41c and secure the handle portions of the blank together, as illustrated in FIG. 17. Adhesive is then applied to tabs 55c, 61c and 62c.

Figure 18:
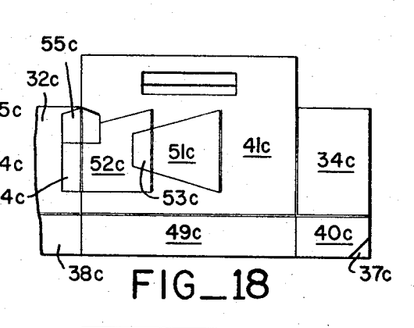
Figure 19:
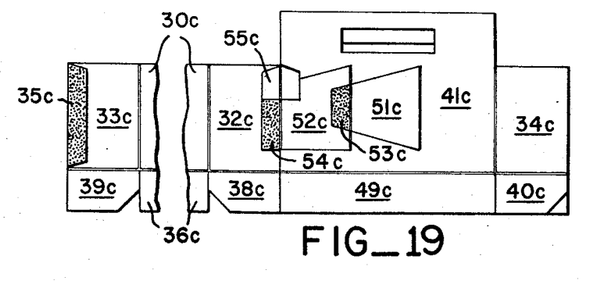
Figure 20:
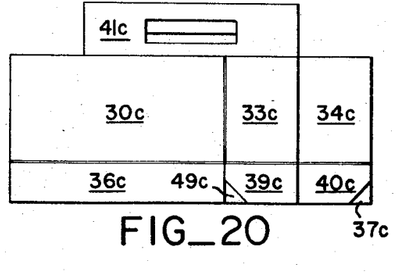

Second end panel portion 34c and partition panels 41c and 42c are folded in the "second direction" to superimpose them upon second side panel 31c and first end panel 32c, as illustrated in FIG. 18. Tab 55c is thus secured to first end panel 32c whereas tabs 61c and 62c function to secure divider panels 59c and 60c to second side panel 31c. Suitable adhesive is then applied to tabs 53c and 54c, as illustrated in FIG. 19. Flap 35c is then folded in the "first direction" to superimpose it upon first end panel portion 33c and a suitable adhesive is applied thereto in the manner shown. Panels 30c and 33c are then folded in the "first direction" to secure flap 35c to panel 41c and tabs 53c and 54c to side panel 30c to secure divider panels 51c and 52c to side panel 30c. The carrier is shown in its flattened form in FIG. 20.

Figures 13, 14:
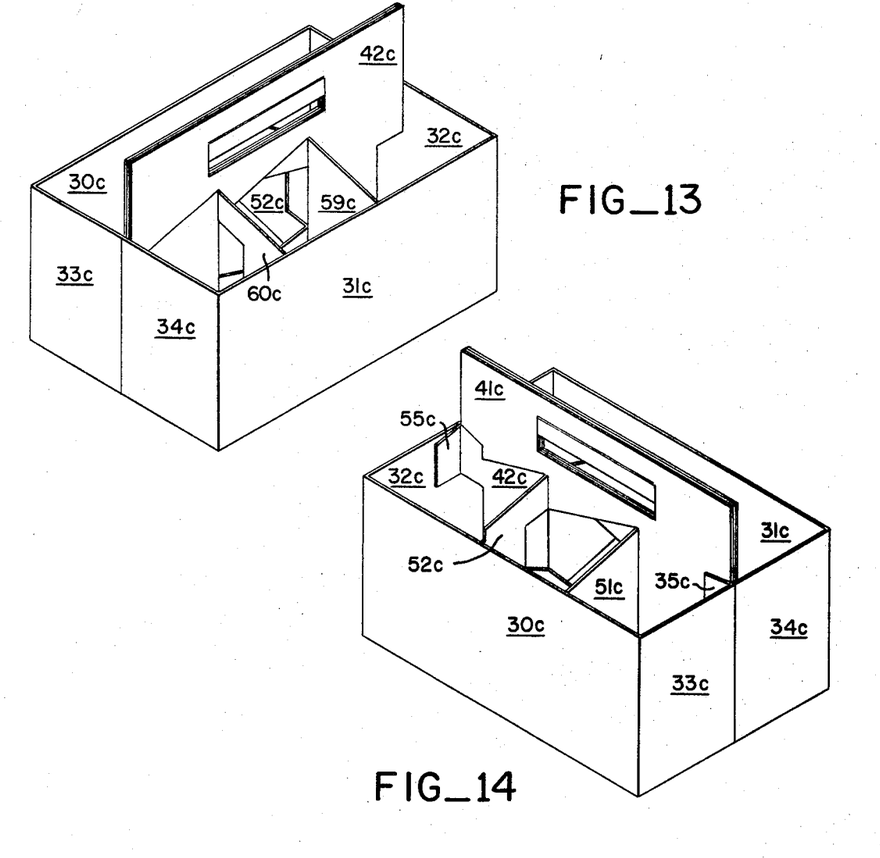
FIGS. 13 and 14 are isometric views illustrating a third basket style carrier embodiment of this invention.

The carrier is shipped to a bottling plant in this form and the body portion thereof is opened to the tubular shape illustrated in FIGS. 13 and 14. The bottom portion of the carrier may be formed in substantially the same manner as above-described in connection with the forming of the bottom portion for the first carrier embodiment of FIGS. 1-3. Flaps 49c and 58c are first folded to a horizontally disposed position and flaps 38c 39c and 40c are then folded onto flaps 49c and 58c. Side panel flaps 36c and 37c are then suitably secured to the other flaps to form an integrated bottom portion of the carrier.

FIGS. 21-29 CARRIER

FIGS. 21-29 illustrate a fourth carrier embodiment of this invention. The letter d accompanies numerals depicting elements disclosed in this carrier corresponding to like-numbered elements disclosed in the previously described carrier embodiments. The primary difference between this carrier embodiment and the others resides in the utilization of a separate blank (FIG. 29) not integrally connected to the other panels for forming divider panels 51d, 52d, 59d and 60d. This divider panel blank is integrated into the carrier after the blank of FIG. 24 has been formed into the flattened condition illustrated in FIG. 28.

Figures 21, 22, 23:
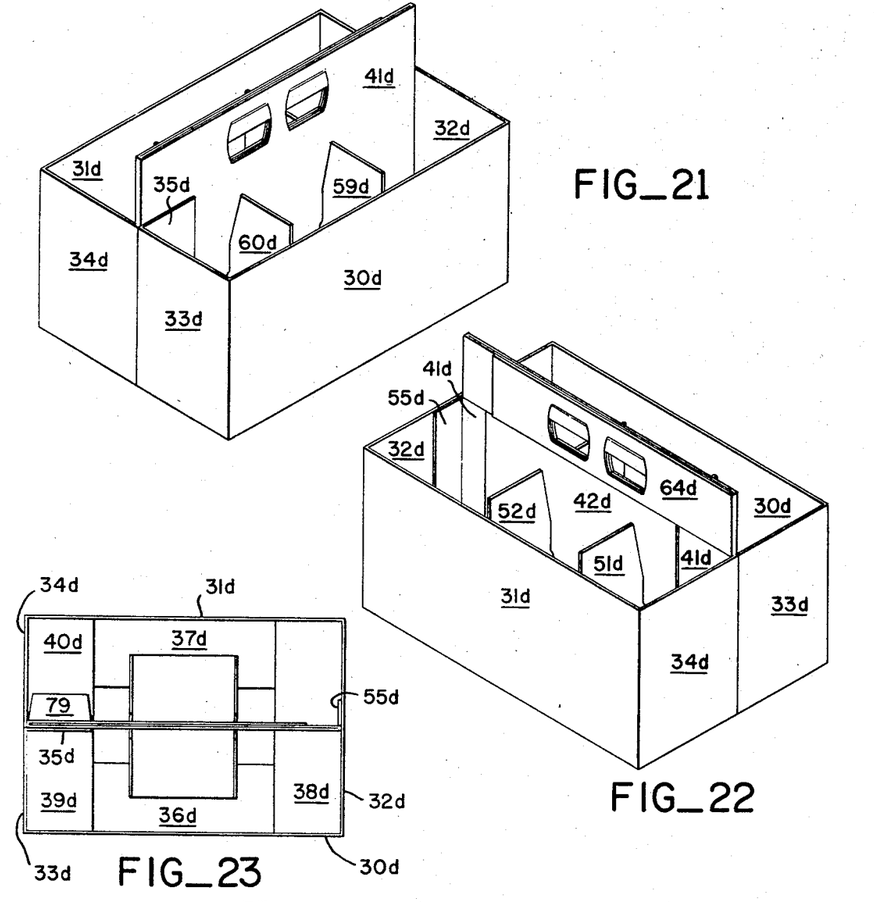
FIGS. 21 and 22 are isometric views illustrating a fourth basket style carrier embodiment of this invention.
FIG. 23 is a top plan view of the carrier disclosed in FIGS. 21 and 22.
Figure 29:
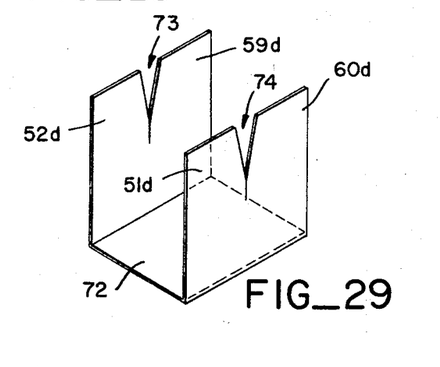
FIG. 29 is an isometric view illustrating an erected divider panel employed in the carrier disclosed in FIGS. 21–23.

A panel 72 connects the divider panels by parallel score lines to facilitate a folding of the divider panels into the upstanding position illustrated in FIG. 29. Also, V-shaped cutout portions 73 and 74 are arranged to terminate in slits at their lower ends to facilitate insertion of the erected divider panel blank into the tubular shaped carton, as will be hereinafter explained. Slots 75–78 (FIG. 24) are formed in panels 41d and 42d to facilitate such insertion. In addition, this embodiment further comprises a tab 79 arranged to more securely integrate the bottom portion into the carrier (FIG. 23).

Figures 24, 25, 26:
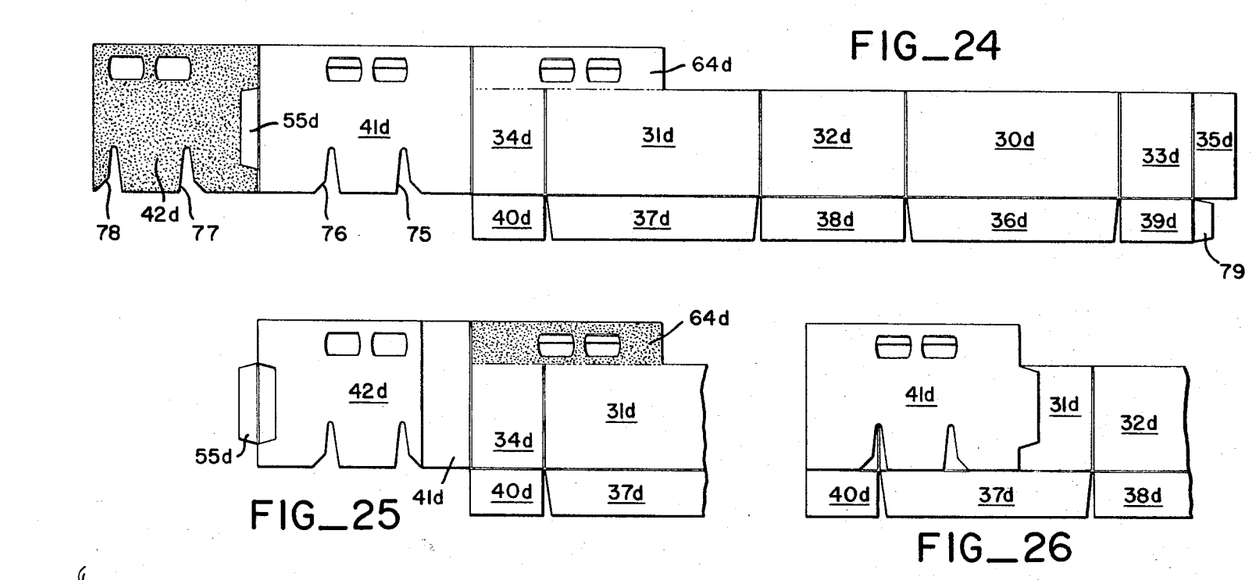
FIG. 24 is a top plan view of the blank utilized to form the carrier disclosed in FIGS. 21–23.
FIGS. 25–28 are top plan views illustrating steps occurring during the preferred method for forming the carrier disclosed in FIGS. 21–23.
Figure 27:
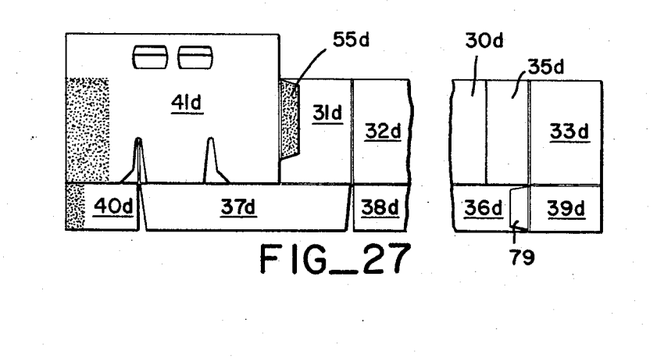

The one-piece carrier blank illustrated in FIG. 24 is preferably arranged to be moved upwardly along a line of flight. Partition panel 42d is coated with a suitable adhesive, as illustrated in this figure. This panel is then folded in the "first direction" and into superimposed and secured relationship with partition panel 41d, as illustrated in FIG. 25. Handle re-enforcing panel 64d, detachably secured to panels 31d and 34d and hingedly connected to panel 41d, is then coated with a suitable adhesive. Panels 41d and 42d are folded in the "first direction" to superimpose them upon second side panel 31d and second end panel portion 34d to secure upper portions thereof to panel 64d (FIG. 26). Adhesive is then applied to the areas of panel 41d, flap 40d and tab 55d illustrated in FIG. 27. First end panel portion 33d, flap 35d and tab 79 are then folded in the "second direction" and into superimposed relationship with first side panel 30d and flap 36d in the manner illustrated.

Figure 28:
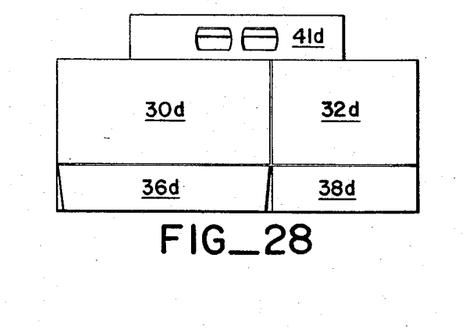

Thereafter, first end panel 32d and the elements connected thereto are folded in the "second direction" to superimpose them upon and secure them to underlying elements to form the flattened carrier illustrated in FIG. 28. In particular, flap 35d is secured to partition panel 41d, flap 55d is secured to first end panel 32d and tab 79 is secured to flap 40d. When the flattened, partially formed carrier is opened, handle re-enforcing panel 64d detaches from panels 31d and 34d to assume the position illustrated in FIG. 22. The integrated divider panels, illustrated in FIG. 29, are then inserted through the open bottom of the carrier and positioned so that cutout portions 73 and 74 suitably align themselves with slots 76–77 and 75–78, respectively. The slits formed at the lower ends of cutout portions 73 and 74 are constructed and arranged to mechanically lock the panels together. The bottom portion is then formed in substantially the same manner as the previously described ones (FIG. 23).

It should be understood that a number of modifications may be made to the above described carriers, blanks and methods without departing from the scope of this invention. For example, a single partition panel 41a–41d may be utilized in certain applications with divider panels for retaining the bottles suitably arranged to form the desired compartments. Also, flaps 35a–35d may be eliminated and other means, such as tape or other suitably arranged flaps, substituted in lieu thereof. Although the carriers preferably comprise divider panels for separating the bottles or other carried objects, such divider panels could be eliminated, rearranged or suitable retaining means substituted in lieu thereof.

We claim:

1. A one-piece basket style carrier formed from a single blank comprising body, partition and bottom portions, said body portion comprising vertically disposed and parallel first and second side panels connected together by vertically disposed and parallel first and second end panels, said side panels and said first end panel integrally connected together at common score lines, said second end panel comprising first and second portions attached together at a mid-portion of said second end panel, said partition portion arranged in vertically disposed and parallel relationship to said side panels, said partition portion integrally connected to the first portion of said second end panel at a common score line and attached to said first end panel and divider panels vertically disposed within said carrier and arranged to extend between said partition portion and each of said side panels to define a plurality of compartments in said carrier.

2. The invention of claim 1 further comprising at least one tab integrally connected to said partition portion at a common score line, said tab attached to said first end panel.

3. The invention of claim 1 wherein said divider panels are arranged to extend vertically to be substantially co-extensive with respect to said side panels.

4. The invention of claim 1 wherein said divider panels constitute a separate blank, not integrally connected to the other panels of said carrier.

5. The invention of claim 1 wherein said divider panels are cut out of and integrally connected to said partition portion.

6. The invention of claim 5 further comprising an additional divider panel arranged to substantially lie in the plane of said partition portion and integrally connected to one of the other of said divider panels at a common score line, said additional divider panel and the divider panel connected thereto both cut out of a panel of said partition portion.

7. The invention of claim 1 wherein said bottom portion comprises a plurality of flaps connected to said side and end panels, said flaps arranged in superimposed relationship and attached together.

8. The invention of claim 7 wherein said bottom portion further comprises at least one flap connected to said partition portion and attached to the other of said flaps.

9. A one-piece basket style carrier formed from a single blank comprising body, partition and bottom portions, said body portion comprising vertically disposed and parallel first and second side panels connected together by vertically disposed and parallel first and second end panels, said side panels and said first end panel integrally connected together at common score lines, said second end panel comprising first and second portions attached together at a mid-portion of said second end panel, said partition portion arranged in vertically disposed and parallel relationship to said side panels, said partition portion integrally connected to the first portion of said second end panel at a common score line and attached to said first end panel, and a flap integrally connected to the second portion of said second end panel at a common score line, said flap attached to said partition portion.

10. A one-piece basket style carrier formed from a single blank comprising body, partition and bottom portions, said body portion comprising vertically disposed and parallel first and second side panels connected together by vertically disposed and parallel first and second end panels, said side panels and said first end panel integrally connected together at common score lines, said second end panel comprising first and second portions attached together at a mid-portion of said second end panel, said partition portion arranged in vertically disposed and parallel relationship to said side panels, said partition portion integrally connected to the first portion of said second end panel at a common score line and attached to said first end panel, said partition portion comprising first and second partition panels arranged in superimposed relationship, said first partition panel integrally connected at a common score line to one of the portions of said second end panel, said second partition panel connected at a common score line to said first partition panel.

11. The invention of claim 10 wherein said partition portion comprises a handle portion at an upper end thereof having an aperture formed therein for manually grasping said carrier.

12. The invention of claim 11 wherein said handle portion further comprises a third panel secured to said first and second partition panels.

13. The invention of claim 12 wherein said third panel comprises a separate panel, initially connected to said first end panel and one of said side panels.

14. The invention of claim 12 wherein said third panel is integrally connected at a common score line to said partition portion.

15. In a carrier comprising vertically disposed body and partition portions, a horizontally disposed bottom portion and vertically disposed divider panels arranged between said body and partition portions, the invention comprising an additional divider panel arranged to substantially lie in the plane of said partition portion and integrally connected to one of the other of said divider panels at a common score line, said additional divider panel and the divider panel connected thereto arranged substantially perpendicular relative to each other with both cut out of a panel of said partition portion and said additional divider panel having a width substantially less than the width of the divider panel connected thereto.

16. A carrier blank having a plurality of panels arranged in a single row along a line and connected together in series by score lines arranged substantially perpendicularly to said line, said panels comprising first and second side panels, and end panel connected between said side panels and first and second end panel portions each connected to one of said side panels, said panels further arranged to be formed into a tubular body portion of an erected carrier and at least one partition panel connected to one of said first and second end panel portions and constructed to form a partition portion of an erected carrier, arranged in parallel relationship with respect to said side panels and cut and score line means defining at least one divider panel within said partition panel.

17. The invention of claim 16 further comprising a flap connected at one end of said blank to the other one of said first and second end panel portions, said partition panel connected at the other end of said blank.

18. The invention of claim 16 further comprising flaps connected to said side panels and said first and second end panel portions by co-linear score lines arranged parallel to said line, said flaps arranged to be formed into a bottom portion of an erected carrier.

19. The invention of claim 18 further comprising a flap connected to said partition panel by a score line arranged to be co-linear with respect to said last-mentioned score lines, said flap arranged to form the bottom portion of an erected carrier along with the other of said flaps and a handle portion formed on the opposite side of said partition panel.

20. The invention of claim 16 wherein said last mentioned score line means is arranged in substantial parallel relationship with respect to said series of score lines.

21. The invention of claim 20 further comprising a tab connected to a free end of said divider panel by a score line arranged parallel to said score line means, said tab arranged to be secured to one of said side panels of an erected carrier to define compartments therein.

22. The invention of claim 20 wherein said divider panel is arranged to have a height which is substantially co-extensive with respect to said side panels in the direction of said score line means.

23. The invention of claim 16 further comprising a handle portion formed on said partition panel and arranged to extend past the other panels and panel portions in the direction of said score lines.

24. A carrier blank having a plurality of panels arranged in a single row along a line and connected together in series by score lines arranged substantially perpendicularly to said line, said panels comprising first and second side panels, an end panel connected between said side panels and first and second end panel portions each connected to one of said side panels, said panels further arranged to be formed into a tubular body portion of an erected carrier, and two partition panels connected together with one of said partition panels connected to one of said end panel portions.

25. A carrier blank having a plurality of panels arranged in a single row along a line and connected together in series by score lines arranged substantially perpendicularly to said line, said panels comprising first and second side panels, an end panel connected between said side panels and first and second end panel portions each connected to one of said side panels, said panels further arranged to be formed into a tubular body portion of an erected carrier, at least one partition panel connected to one of said first and second end panel portions and constructed to form a partition portion of an erected carrier, arranged in parallel relationship with respect to said side panels, a handle portion formed on said partition panel and arranged to extend past the other panels and panel portions in the direction of said score lines, and a handle reinforcing panel detachably connected to said first end panel and one of said side panels and arranged to be substantially coextensive with respect to the handle portion of said partition panel.

26. The invention of claim 25 wherein a second of said carrier blanks is arranged in nested relationship with said first mentioned blank, the handle re-enforcing panel of said second blank arranged between the first-mentioned blank's, handle portion and handle re-enforcing panel.

27. In a blank arranged to be erected into a carrier, a partition panel lying in a plane and having cut and score line means defining consecutive first, second and third divider panels therein, said first and second divider panels connected together on a common first score line, said third divider panel connected to said partition panel on a second score line arranged in parallel relationship to said first score line, said second and third divider panels arranged to be folded perpendicularly relative to the plane of said partition panel and said first divider panel having a width substantially less than the width of said second divider panel and arranged to be folded through 180° to lie in the plane of said partition panel and within an opening formed by removal of said second divider panel when said second divider panel is folded perpendicularly.

28. A method for forming a one-piece blank into a flattened basket style carrier comprising the steps of arranging along a common line a blank comprising a plurality of panels connected together in series at parallel score lines with said score lines arranged perpendicularly with respect to said common line, folding said panels at least three times along said common line and securing said panels together to form a flattened carrier comprising integrated body and partition portions arranged in parallel relationship relative to each other and opening said flattened carrier and forming a bottom closure thereon.

29. A method for forming a one piece blank into a flattened basket style carrier comprising the steps of arranging along a common line a blank comprising in series a first end panel portion, a first side panel, a first end panel, a second side panel, a second end panel portion and a partition panel all connected together by parallel score lines, said score lines arranged perpendicularly relative to said line, folding said second end panel portion and said partition panel along said line to superimpose them upon said second side panel, folding said first end panel portion and said first side panel along said line to superimpose them upon said first end panel and said partition panel, securing said first end panel portion to said second end panel portion to form a second end panel, and securing a free end of said partition panel to said first end panel to form a flattened carrier comprising a contiguous body portion comprising said first and second side panels and said first and second end panels and a partition portion comprising said partition panel arranged in parallel relationship relative to said body portion with said partition panel secured whereat said first and second end panels are secured together.

30. The invention of claim 29 further comprising the step of arranging a plurality of divider panels in said carrier between said partition panel and each of said side panels to form a plurality of compartments arranged substantially co-extensively with respect to said side panels, said compartments adapted to retain and separate bottles therein.

31. The invention of claim 30 wherein the step of arranging said divider panels in said carrier includes the step of cutting said divider panels out of said partition panel.

32. The invention of claim 31 wherein the step of arranging said divider panels in said carrier further includes the step of cutting an additional divider panel out of said partition panel and folding it out of and back into the plane of said partition panel at a score line common to one of the other of said divider panels.

33. The invention of claim 30 wherein the step of arranging said divider panels in said carrier includes the steps of opening said carrier to form a tubular body portion having said side walls arranged in parallel relationship to said partition panel and inserting a separate blank into said carrier and attaching it to said partition panel.

34. The invention of claim 29 further comprising the step of folding into superimposed relationship a plurality of flaps integrally connected to each one of said panels by score lines arranged perpendicularly relative to the other of said score lines and securing said flaps together to form a bottom portion of said carrier.

35. A method for forming a re-enforcement for a handle portion of a carrier comprising the steps of forming a blank to define a first panel having a handle portion located thereon and a second panel having a re-enforcing panel detachably connected thereto, superimposing and securing together the handle portion of said first panel and said reenforcing panel and moving said first and second panels away from each other to detach said re-enforcing panel from said second panel.

36. In a blank arranged to be erected into a carrier, a partition panel lying in a plane and having cut and score line means defining consecutive first, second and third divider panels therein, said first and second divider panels connected together on a common first score line, said third divider panel connected to said partition panel on a second score line arranged in parallel relationship to said first score line, said second and third divider panels arranged to be folded perpendicularly relative to the plane of said partition panel, said first divider panel arranged to be folded through 180° to lie in the plane of said partition panel and within an opening formed by removal of said divider panel when said second divider panel is folded perpendicularly, and first and second tabs connected to said second and third divider panels, respectively, on score lines arranged in substantial parallel relationship to said first and second score lines.

References Cited

UNITED STATES PATENTS

| | | | |
|---|---|---|---|
| 2,273,266 | 2/1942 | Himes | 220—111 |
| 2,609,137 | 9/1952 | Toensmeier | 220—105 |
| 2,684,178 | 7/1954 | Keeler | 220—115 X |
| 2,832,504 | 4/1958 | Foster | 220—115 |
| 3,031,813 | 5/1962 | Ganz. | |
| 3,269,636 | 8/1966 | Holmes | 229—15 |

DONALD F. NORTON, *Primary Examiner.*

UNITED STATES PATENT OFFICE
CERTIFICATE OF CORRECTION

Patent No. 3,411,663                              November 19, 1968

Norman H. Moore et al.

It is certified that error appears in the above identified patent and that said Letters Patent are hereby corrected as shown below:

Column 2, line 70, ". The term "integrally connected" as herein employed" should read -- , it should be understood that the teachings herein --. Column 6, line 64, "tn" should read -- in --.

Signed and sealed this 17th day of March 1970.

(SEAL)
Attest:

Edward M. Fletcher, Jr.                         WILLIAM E. SCHUYLER, JR.
Attesting Officer                                     Commissioner of Patents